United States Patent Office 3,293,040
Patented Dec. 20, 1966

3,293,040
METHOD FOR CHILL-PROOFING BEER WITH WATER SOLUBLE ALKYL CELLULOSE ETHERS
Richard G. Shaler, Jr., San Anselmo, Calif., and Raymond L. McAdam, Las Vegas, Nev., assignors to American Tansul Company, Las Vegas, Nev.
No Drawing. Filed May 25, 1964, Ser. No. 370,050
10 Claims. (Cl. 99—48)

This is a continuation-in-part of copending application Serial No. 210,813, filed July 18, 1962, now abandoned.

This invention relates to beer, the treatment thereof during processing, and a novel composition having utility in such treatment and elsewhere. More particularly it relates to a method and composition for the treatment of beer during processing for chill-proofing the beer.

The present invention is in part an improvement in the now conventional method of chill-proofing beer by the addition to the beer of a swelling gelling clay such as hectorite during processing of the beer. In the preferred embodiment the present invention contemplates the combination of a water soluble cellulose ether with the clay. This combination is employed as the clay itself was previously employed. Through the use of the new combination it has been discovered that the chill-proofing properties of the clay are maintained as before but the sludge produced by the clay in the beer is substantially reduced. Also, it appears that the beer is less turbid than when the clay alone is used.

Sludge reduction is desirable since beer is trapped by the sludge and is lost when the sludge is removed. By reducing the sludge level a greater recovery and yield of beer is possible.

Thus the present invention provides an improvement in the method of treating beer with a swelling gelling clay to chill-proof the beer which comprises adding about .1–20% with respect to the clay of a water soluble cellulose ether to the beer during the treatment thereof with the clay. The new composition of the present invention may be defined as a swelling gelling clay and about .1–20% by weight with respect to the clay of a water soluble cellulose ether.

While the method aspect of the present invention is described particularly with respect to the treatment of beer, it should be understood that the invention contemplates the use of malt beverages and the like generally.

Beer production follows a generally accepted sequence of steps. First, aqueous extract from suitable grain must be fermented to produce the beer. After fermentation has been completed, the temperature is dropped to approximately 30° F. and the beer is transferred from the fermentation equipment into a storage vessel for a rest or aging period at about 30–32° F. The rest period may be as little as five days and in some cases as much as three months. Carbon dioxide may or may not be introduced into the beer during the rest period. The $CO_2$ is used to partially carbonate the beverage and to purge the liquid of entrapped air. After storage, the beer is put through a pre-clarification operation. This is usually accomplished with some mechanical means such as a centrifuge or a filter. The beer is then transferred into a finishing storage tank for another storage period of about one to five days, during which final carbonation is accomplished. Following the finishing period, the beer is polish filtered. The beer is then in a form as found in the final product when purchased by the consumer.

During the course of the processing subsequent to fermentation, several treatments have become standard which serve to stabilize and make the final product more desirable in many respects. The beer may be treated with a clay in accordance with the method described in United States Patent No. 2,416,007 dated February 18, 1947. That patent teaches the addition of an aqueous suspension of a magnesium silicate clay into the beer for removing foreign and partially soluble substances from beer such as undesirable proteins and proteinaceous complexes.

The present invention is an improvement upon the broad concept of the method and materials described in said patent. The gist of the present invention is in the combination of a water soluble cellulose ether in certain percentages as noted herein with the clay being used.

As in prior beer treating procedures, the clay in combination with the cellulose ether may be introduced at any time after fermentation. As before, the materials are generally introduced in an aqueous slurry. Also in accordance with prior techniques, additional treatments for stabilizing and clarifying the beer may be employed. These additional steps include the use of reducing agents such as potassium metabisulfite, or preferably $SO_2$ gas itself, in accordance with United States Patent No. 2,916,377 dated December 8, 1959. It is also common to employ a proteolytic enzyme such as bromelin and/or papain. The use of these other materials in the present improved process is unchanged from prior art techniques in all respects such as quantities employed or point in the brewing process where employed. For example, when $SO_2$ is used it may be introduced in the range of 5–30 parts per million and the enzyme dosage may be between 500–15,000 activity units per 100 barrels of beer processed, and they may be added at any point after fermentation individually or simultaneously.

In preparing and using the present composition to practice the present method, the cellulose ether may be combined with the selected clay at any time up to and including the actual treatment of the beer. Thus it is contemplated that the cellulose ether may be combined with the clay ore during the refining of the ore. Alternatively, the cellulose ether may be subsequently combined in a dry form with dry refined clay. Another alternative is to add the cellulose ether to the clay mix water in the brewery. It has been found, however, that the addition of the cellulose ether to hydrated clay is not as suited as other alternatives.

The preferred method of preparation of the composition is to combine the cellulose ether with the clay prior to its use in the brewing process or otherwise and to do so by mixing aqueous slurries of the clay and cellulose ether. Preferably the then combined slurries are dried. The dried combined slurry is preferably re-slurried in water and added to the beer at a suitable point in the brewing process. By mixing through combination of aqueous slurries, drying and re-slurrying, the materials of the new composition have been found to be easier to handle and thinner in consistency.

Conventionally, the selected clay is added to the beer in an amount of about 120–500 parts per million. This range is employed in the present invention with the level generally being about 200 parts per million. As noted, the cellulose ether is added with respect to the clay in an amount of .1–20% by weight. Preferably, however, the cellulose ether is combined with the clay in an amount of 3–10% by weight of the clay. While larger percentages of cellulose ether might still be operable, if it is desired to keep the addition of clay and ether to the usual range of 120–500 parts per million and preferably 200 parts per million, the use of significantly higher percentages of ether will reduce the chill-proofing capacity of the additive.

As noted above the present invention contemplates the use of swelling gelling clays broadly. This includes but is not necessarily limited to colloidal materials of the following classification:

CATION-EXCHANGEABLE INORGANIC COLLOIDS (A) Natural clays:
  Bentonites:
    Wyoming bentonite
    Montmorillonites:
      Hectorite
  Beidellite
  Saponite
  Nontronite
  Sepiolote
  Biotite
  Vermiculite
  Zeolites:
    Edingtonite
    Chabazite
    Natrolite
    Mordenites
(B) Synthetic clays:
  Magnesia-silica-sodium oxide
  Lime-silica-potassium oxide
  Baria-silica-lithium oxide
(C) Synthetic zeolites:
  Complex aluminum silicates—exchangeable cation:
    Hydrogen
    Sodium
    Potassium
    Barium
    Magnesium
    Ammonium Preferably, the clay selected is a member of the montmorillonite group. Hectorite has been found to be a most satisfactory choice in this regard.

The other member of the new compositions noted above is preferably the water soluble cellulose ether portion. Generally, any of the large group of thickener gum materials that is water soluble or may be rendered water soluble by forming a salt thereof, for example, is suitable. The group preferably includes hydroxy and carboxy alkyl cellulose ethers generally with some specific examples being:

Carboxymethyl cellulose
Carboxymethyl methyl cellulose
Hydroxy propyl methyl cellulose
Methyl cellulose
Carboxymethyl hydroxyethyl cellulose
Hydroxyethyl cellulose These materials may be used in any of their forms with regard to proportions or percent of alkyl and substituted alkyl groups in the total molecule. Preferably, however, the material selected will have the highest viscosity grade available for the particular material selected although any of the viscosity grades of a given cellulose ether could be used.

The following example will illustrate the sludge reduction made possible by the present method and composition.

Example I

Beer that had been previously untreated with chill-proofing agents but which had been prefiltered was chilled to 30° F. and partially degassed. 100 ml. of the beer was then added to a colorimetry tube (100 cc. capacity) and stoppered. Samples of hectorite and hydroxy propyl methyl cellulose (viscosity grade 4,000 centepoise) were prepared by combining aqueous slurries of each and drying the combination. The dried combination was again slurried (a 5% slurry is convenient to use) and added to the beer in the amounts shown in the table. The proportion of cellulose ether to hectorite is also shown in the table for the various samples.

The clay-ether slurry was injected in the tubes containing the beer with a hypodermic syringe. Immediately after treatment the tubes were inverted twice to thoroughly mix the contents.

The tubes were then stored at 32° F. and remained undisturbed until observed at the times indicated following mixing.

The percent sludge in the tube is determined by measuring the height of the sludge compared to the height of the beer in each tube (all tube diameters were the same).

| Percent of Cellulose Ether to Clay | Parts per Million | Percent of Sludge in Beer | |
|---|---|---|---|
| | | 5 hours | 72 hours |
| .1 | 200 | 22.6 | 15.2 |
| .4 | 200 | 24.6 | 15.6 |
| 4.0 | 200 | 20.0 | 13.2 |
| 10.0 | 200 | 14.5 | 9.9 |
| Pure hectorite control | 200 | 22.7 | 14.6 |
| Do | 180 | 20.2 | 13.6 |
| Do [1] | 200 | 27.4 | 17.8 |
| Do [1] | 180 | 25.7 | 15.6 |

[1] Prepared by forming an aqueous slurry, drying, and then reslurrying for use.

Example II

The present compositions and method for chill-proofing beer were used in a pilot brewery under simulated brewery conditions for the production of beer. Hydroxy methyl propyl cellulose in combination with hectorite was added at 200 parts per million to the beer. Controls were added at the same concentration. The cellulose was 10% by weight of the hectorite. Addition was made in an aqueous slurry subsequent to fermentation and before final filtration. The sludge level was observed 10 days after addition of the composition. Results are as follows:

Material added: Sludge level, inches
Pure hectorite control _____ 3
Hydroxy propyl methyl cellulose—4,000 centipoise viscosity—combined with hectorite by mixing aqueous slurry of each and drying mixture _____ 2.25

In a subsequent experiment the following results were observed:

Inches
Pure hectorite control _____ 3.25
Hydroxy propyl methyl cellulose—15,000 centipoise viscosity—this was combined with hectorite by mixing aqueous slurries of each and drying mixture _____ 2.75

In employing the present composition and method, in addition to sludge level reduction, it has been found that the turbidity of the beer before final filtration appears to be reduced. Thus it has been observed that when pure hectorite is used for chill-proofing, the beer has a turbidity level of about 40–60 Nephelos units whereas when the hectorite is combined with a cellulose ether as described herein, the turbidity level is about 30 Nephelos units. A Nephelos unit is a measure of relative turbidity obtained from a Nephelometer. The units increase with increasing turbidity.

Although of great importance the present compositions have utility in areas other than the brewing industry. For example, the compositions have been observed to have great advantage in the paper making industry. In the latter area the compositions serve to clarify the "white water" connected with paper manufacture by causing white pigments such as titanium dioxide to be retained in the paper solids while at the same time yielding an improved paper surface.

Although the foregoing invention has been described in some detail by way of illustration and example for purposes of clarity of understanding, it is understood that

What is claimed is:

1. In the method of treating beer with a swelling gelling clay to chill-proof the beer, the improvement which comprises adding about .1–20% by weight with respect to the clay of a water soluble alkyl cellulose ether to the beer during the treatment thereof concurrently with said clay whereby the sludge level of the clay and the turbidity of the beer are reduced.

2. The improved method in accordance with claim 1 wherein the swelling gelling clay is montmorillonite clay.

3. The improved method in accordance with claim 2 wherein the montmorillonite clay is hectorite.

4. The improved method in accordance with claim 3 wherein the cellulose ether is added in the amount of about 3–10% by weight of the hectorite.

5. In the method of treating beer with a montmorillonite clay to chill-proof the beer, the improvement which comprises adding about 3–10% by weight with respect to the clay of a water soluble ether selected from the group consisting of carboxy alkyl and hydroxyalkyl cellulose ethers to the beer during the treatment thereof concurrently with said clay whereby the sludge level of the clay and the turbidity of the beer are reduced.

6. The improved method in accordance with claim 5 wherein the montmorillonite clay is hectorite.

7. An improved method for chill-proofing beer comprising mixing about .1–20% by weight of a water soluble alkyl cellulose ether with a swelling gelling clay, treating beer during processing with a sufficient amount of said mixture to chill-proof the beer, and then removing the mixture from the chill-proofed beer.

8. An improved method in accordance with claim 7 wherein the swelling gelling clay is hectorite and the mixture is added to the beer in an amount of about 200 parts per million of the beer.

9. An improved method for chill-proofing beer comprising mixing about 3–10% by weight of a water soluble alkyl cellulose ether with a montmorillonite clay by forming an aqueous slurry with each of said cellulose ether and clay and then combining the slurries, drying the combined slurries, re-slurrying the dried mixture in water, and adding said re-slurried mixture to beer during the processing thereof in an amount sufficient to chill-proof the beer.

10. An improved method in accordance with claim 9 wherein the montmorillonite clay is hectorite and the cellulose ether is hydroxy propyl methyl cellulose.

References Cited by the Examiner
UNITED STATES PATENTS

| | | | |
|---|---|---|---|
| 2,291,624 | 8/1942 | Heimann et al. | 99—48 |
| 2,588,379 | 3/1952 | Freieden et al. | 99—48 |

A. LOUIS MONACELL, *Primary Examiner.*

D. M. STEPHENS, *Assistant Examiner.*